Patented June 1, 1943

2,320,859

UNITED STATES PATENT OFFICE 2,320,859

STABILIZATION OF STYRENE

Stanley George Foord, London, England, assignor to International Standard Electric Corporation, New York, N. Y.

No Drawing. Original application December 14, 1942, Serial No. 204,975. Divided and this application November 14, 1940, Serial No. 365,658. In Great Britain April 1, 1938

5 Claims. (Cl. 260—669)

This invention relates to a process of treating styrene by the use of inhibitors of polymerisation that are only sparingly soluble in styrene (i. e., to the extent of less than 0.1%).

Such inhibitors appear to act in the inhibition of polymerisation by slowly combining with the styrene. During such combination no polymerisation takes place and the period elapsing before the start of polymerization is herein termed the induction period. Thus an extended induction period can be produced by adding the required amount of sparingly soluble inhibitor to the styrene. Some of the inhibitor dissolves in the styrene, i. e., enough to form a saturated solution. As this inhibitor is used up by reacting with the styrene more goes into solution. Whatever the theoretical explanation, the undissolved excess of inhibitor is gradually used up during the induction period. Such sparingly soluble inhibitors are catechol, hexamine (i. e., hexamethylene tetramine), hydroquinone, hydroxylamine hydrochloride, resorcinol, 1.5 dinitroanthraquinone, and an inorganic salt of methyl p.aminophenol such as the sulphate (metol).

Hydroquinone has previously been suggested as a stabilizer of styrene against polymerisation, but the conclusion was reached that in a given period of time a lessened degree of polymerisation would take place in the presence of hydroquinone than in its absence. The other substances mentioned above have, however, not previously been suggested as stabilizers of styrene for an extended period. Moreover, the manner in which these sparingly soluble substances mentioned above act in inhibiting polymerisation of styrene is my discovery.

When using an inhibitor of polymerisation of styrene, it is necessary to remove the inhibiting effect before the polymerisation. With known inhibitors such as benzoquinone and hydroquinone it has previously been thought necessary to remove excess of inhibitor from the styrene by some such process as washing out with caustic soda or distillation under reduced pressure.

At an elevated temperature a sparingly soluble inhibitor when present in excess produces a period during which no polymerisation takes place and thereafter may produce a period during which the polymerisation is considerably retarded. If therefore styrene be heated with undissolved excess of inhibitor present, in an attempt to polymerise the styrene, the inhibitor in solution is used up in combining with styrene and thus first inhibiting and then retarding polymerisation, and as it is used up more inhibitor goes into solution and when in solution continues the retarding of polymerisation until all the inhibitor both free and dissolved is used up.

It will be seen therefore that the inhibitor must be removed before polymerisation is attempted, if this is to be completed in any reasonable time. I have discovered however that when a sparingly soluble inhibitor is used it is only necessary to remove the undissolved inhibitor. I have discovered that the extent to which the time of heating required to effect polymerisation is prolonged by the amount of inhibitor remaining in solution, i. e., the amount required to produce a saturated solution, is inconsiderable at the temperatures normally used for polymerisation, e. g., 120° C.

According to the present invention a process for treating styrene comprises adding to the styrene an amount of a sparingly soluble inhibitor of polymerisation sufficient to maintain a saturated solution thereof in the styrene over the period of time during which polymerisation of the styrene is to be inhibited and then filtering off undissolved inhibitor prior to polymerisation of the styrene.

The following table shows the induction periods of styrene at 60° C. caused by various sparingly soluble inhibitors when added in the percentage by weight stated in the second column of the table:

| Inhibitor | Per cent added | Induction period at 60° C. |
|---|---|---|
| | Per cent | Hours |
| Hydroquinone | 0.5 | 170 |
| Catechol | 0.5 | 170 |
| Metol | 0.5 | 110 |
| Hexamine (hexamethylene tetramine) | 0.5 | 30 |
| Hydroxylamine hydrochloride | 0.5 | 50 |
| Resorcinol | 0.5 | 30 |
| 1.5 dinitroanthraquinone | 0.5 | 350 |

At the completion of the induction period the styrene commences to polymerise at a rate which rapidly increases to a maximum, and then continues steadily, the rate of polymerisation being a function of the temperature and of the nature and concentration of the substance that has been added.

In all the above cases, with the exception of catechol, the rate at which polymerisation proceeds after the induction period is not greatly affected by the presence of the added substance unless it is present in excess. Catechol, however, causes a very definite and perceptible slowing down of the rate of polymerisation.

The induction period for each of the above substances is given at 60° C. instead of at room temperature because of the length of time that would be necessary to verify the length of the induction period at room temperature, since this is very long, being related to the induction period at higher temperatures by an exponential law.

I have found, however, that with these sparingly soluble inhibitors, filtration is sufficient to remove all inhibitor save such a small quantity that the increase in induction period at polymerisation temperature, e. g., 120° C., due to the presence of that quantity, is inappreciable.

A good inhibitor for this purpose is hydroquinone. I have found that hydroquinone dissolves in styrene at room temperatures only to the extent of 0.001%. Consequently, in order to polymerise styrene to which has been added a large amount of hydroquinone, the undissolved hydroquinone is filtered off, leaving styrene with only 0.001% of dissolved hydroquinone. The induction period at 120° C. of this material is not more than 10 minutes, i. e., inappreciably greater than that of pure styrene.

Some of the substances mentioned are, compared with hydroquinone, much more soluble, but still must be classed as sparingly soluble, i. e., to the extent of less than 0.1%. It has been mentioned above that catechol not only acts as an inhibitor of polymerisation but also slows down the rate of polymerisation at the end of the induction period. This latter effect is only appreciable, however, in the presence of so much catechol that some of it is originally undissolved, but after filtration the effect of the amount left in solution is inappreciable.

The present application is a division of my U. S. Patent 2,225,471, issued December 17, 1940, and entitled "Stabilization of styrene."

What is claimed is:

1. A process of inhibiting styrene against polymerisation which comprises adding 1.5 dinitroanthraquinone to the styrene.

2. Styrene inhibited against polymerisation by the addition of 1.5 dinitroanthraquinone.

3. A process of inhibiting styrene against polymerisation which comprises adding 1.5 dinitroanthraquinone to the styrene in a proportion not more than 0.5% of the styrene.

4. A styrene composition comprising styrene together with 1.5 dinitroanthraquinone, the proportion of 1.5 dinitroanthraquinone being not more than 0.5% of the styrene.

5. A styrene composition comprising a saturated solution of 1.5 dinitroanthraquinone in styrene.

STANLEY GEORGE FOORD.